United States Patent [19]
Pelton et al.

[11] 3,739,870
[45] June 19, 1973

[54] METHOD AND APPARATUS FOR REMOTELY CONTROLLING A SEISMIC VIBRATOR AND RECORDING SYSTEM

[75] Inventors: Charles R. Pelton; Kim L. Mitchell, both of Ponca City, Okla.

[73] Assignee: Pelton Company, Inc., Ponca City, Okla.

[22] Filed: Jan. 29, 1971

[21] Appl. No.: 110,872

[52] U.S. Cl............................ 181/.5 FS, 340/15.5 R
[51] Int. Cl. ........................... G01v 1/16, G01v 1/22
[58] Field of Search........................ 181/.5 FS, .5 T; 340/15.5 RS, 15.5 MR, 15.5 TC, 15.5 DP, 15.5 TM

[56] References Cited
UNITED STATES PATENTS

2,688,124   8/1954   Doty et al. .......................... 340/15.5
3,219,971  11/1965   Cole.................................... 340/15.5
3,460,648   8/1969   Brown et al. ...................... 340/15.5
3,440,599   4/1969   Waters et al....................... 340/15.5

Primary Examiner—Benjamin A. Borchelt
Assistant Examiner—J. V. Doramus
Attorney—Head & Johnson

[57] ABSTRACT

A seismic vibrator capable of producing a computer controlled signal of predetermined frequency characteristics is remotely initiated using encoding and decoding devices. A similar recording apparatus is simultaneously placed into operation.

12 Claims, 5 Drawing Figures

METHOD AND APPARATUS FOR REMOTELY CONTROLLING A SEISMIC VIBRATOR AND RECORDING SYSTEM

BACKGROUND

This invention relates to improvements in the art of geophysical prospecting, and more particularly, but not by way of limitations, to a method and apparatus for developing simultaneously, in different locations, highly accurate identical control signals of desired frequency limits and proportions for controlling the output of seismic vibrators and at the same time making the signal available at another point or points to be recorded or used in the processing of the seismic data without the use of wire or wireless to transmit the actual control signal.

In seismic surveying it has been found highly desirable to impart vibrational seismic energy of predetermined characteristics into the earth from one or more vibrators. In order to enhance the value of the seismic data by using a multiplicity of vibrators, it is highly desirable that all the vibrators impart their signals into the ground at the proper time and phase. Much work has been done on causing the vibrator signals imparted into the earth to be unique and of a desired phase relationship relative to the signal controlling the vibrator. For a discussion of such background, reference is hereby made to U.S. Pat. Nos. 3,208,545; 3,219,971; and the correlation prospecting system as described in No. 2,688,124.

Some of the art has suggested transmitting the vibrator control signal from a central operational position via radio-transmission reception means, as for example suggested in U.S. Pat. No. 2,460,648 and others. However, such systems are subject to phase inaccuracy and interference which degrade the overall performance and results.

Those skilled in the art known under the trademark "VIBROSEIS" of Continental Oil Company have long recognized the desire to achieve a vibrational control signal of predetermined variable amplitude (see G. L. Brown and B. J. Thomas paper Comparison of Digital And Analog Field Recording And Compositing in "VIBROSEIS" Exploration, presented Society of Exploration Geophysicists, Sept., 1969, meeting Calgary, Canada).

SUMMARY

The present invention describes a method and apparatus for generating all seismic control signals, vibrator and recording, at the desired high degree of phase accuracy with respect to one another without regard to the presence of radio interference that would cause a conventionally transmitted control signal to be unusable.

Another object of the invention is to decrease the contamination of the air waves by elimination of continuous radio transmission during the time of seismic recording.

PRIOR ART

Figure 1:
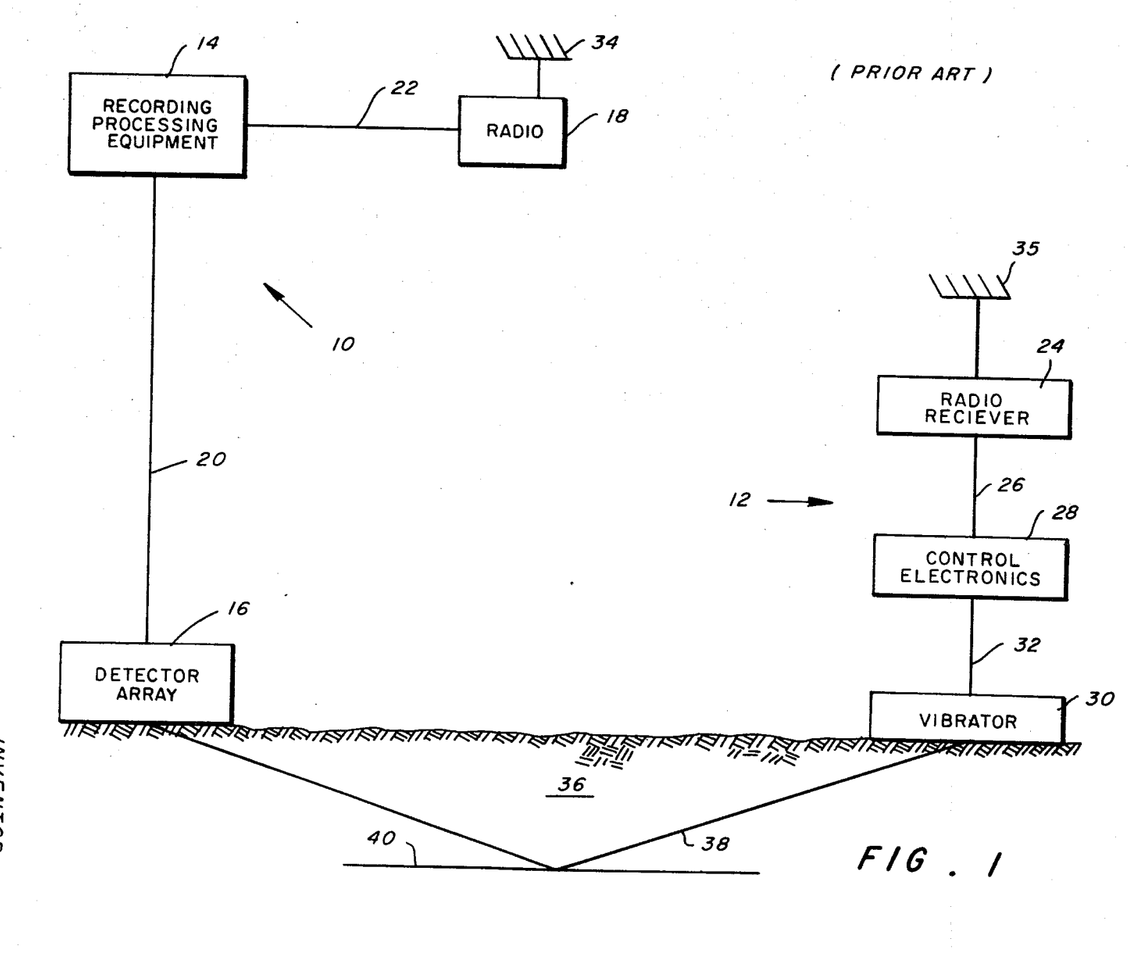
FIG. 1 is a diametric view of the prior art method of conducting a seismic survey.

Referring now to FIG. 1, the present means of vibrational survey makes use of a recording system, generally designated 10, and a vibrator system 12. The recording system 10 usually comprises recording process equipment 14, a seismic vibration detector array 16 and a radio 18. Detector array 16 comprises suitable geophones which are connected to recording-processing equipment 14 as by means of wires 20 or other suitable means. Radio 18 is connected to recording-processing equipment 14 by wire 22.

Vibrator system 12 normally consists of a radio receiver 24 connected by wire 26 to a control circuit 28 which in turn is connected to a suitable vibrator 30 by means of wire 32. Radio 18 communicates with radio receiver 24 via respective antennae 34 and 35.

The recording-process equipment 14 produces a control signal, either computed or from storage, and sends the signal through wire 22 to radio 18 which in turn transmits the signal to radio receiver 24. Radio receiver 24 introduces the vibratory control signal to the control electronics 28 through wire 26 which in turn causes the vibrator by way of wire 32 to impart the desired vibratory seismic signals into the earth 36 as is shown by one possible path 38. This seismic vibratory signal is reflected or refracted by an interface 40 deep in the earth to detector array 16 which is coupled to the earth's surface. The detector array produces a voltage representing the movement of the seismic signals. This voltage is then transferred through wire 20 to the recording process equipment where it is permanently recorded and otherwise used by seismic interpreters to determine geological structure.

DESCRIPTION OF PREFERRED EMBODIMENT

Figure 2:
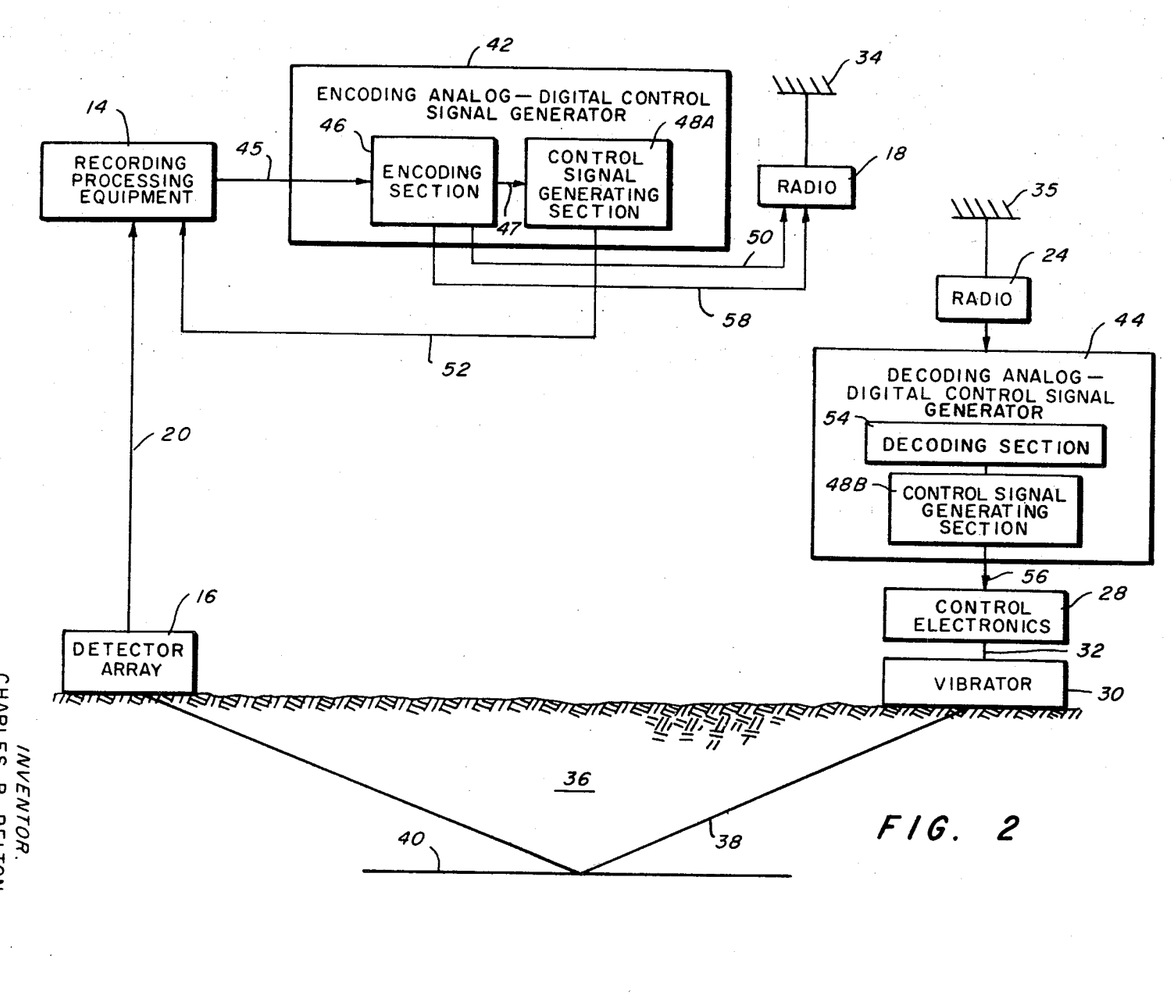
FIG. 2 is an overall view of the method of a seismic survey utilizing the principles of this invention.

The method of this invention differs from the above-described system inasmuch as the vibrator control signal is not transmitted from the recording-processing equipment to the vibrator system, rather, the control signal is generated locally at each vibrator and at the recording-processing equipment in response to a common radio transmitted coded signal. The overall sketch of FIG. 2 depicts one system for remotely controlling and activating a seismic vibrator utilizing the principles of this invention. In this method, the recording system comprises recording-processing equipment 14, detector array 16 and radio 18 as before. However, conduit 22, between recording-processing equipment 14 and radio 18, is replaced by an encoding analog-digital control signal generator 42. Likewise the vibrator system includes the normal radio receiver 24, control electronics 28, and vibrator 30. However, electrical conduit 26 is replaced by a decoding analog-digital control signal generator 44. Encoding analog-digital control signal generator 42, as the name indicates, includes an encoding section 46 whose input is coupled to recording processing equipment 14 by wire 45. Encoding section 46 has triple outputs; one output is coupled to control signal generator 48A by conduit 47, a second output controls radio 24 over conduit 50, and a third output carries a coded tone to radio 24 over conduit 58. Signal generator section 48A has an output which feeds through wire 52 of the recording processing equipment 14.

Decoding analog-digital control signal generator 44 includes a decoding section 54 having the input thereof fed from radio receiver 24 and having an output feeding a second control signal generator 48B which in turn feeds control electronics 28 through a wire 56.

In operation, recording-processing equipment 14 induces a start signal into the encoding section 46. Encoding section 46 turns on radio 18 through wire 50 and generates a tone of specific frequency and phase characteristics for the purpose of modulating radio 18 via wire 58 and further introduces an initiate pulse into computer section 48A. The tone signal from radio 18 is picked up by radio receiver 24 and passed into decoder section 54.

Decoding section 54 decodes the tone received from radio receiver 24 and presents an initiate pulse to control signal generating section 48B which computes a mathematically predetermined unique or control signal which, in turn, causes vibrator 30 to impart such unique vibratory seismic signal 38 into the earth. The reflected and/or refracted signals are subsequently picked up by detector array 16 and relayed in the form of voltage to recording-processing equipment 14. The unique signals generated by control signal generating stations or computers 48A and 48B are identical in nature and occur at the desired high degree of accuracy relative to each other in time.

Figure 3:
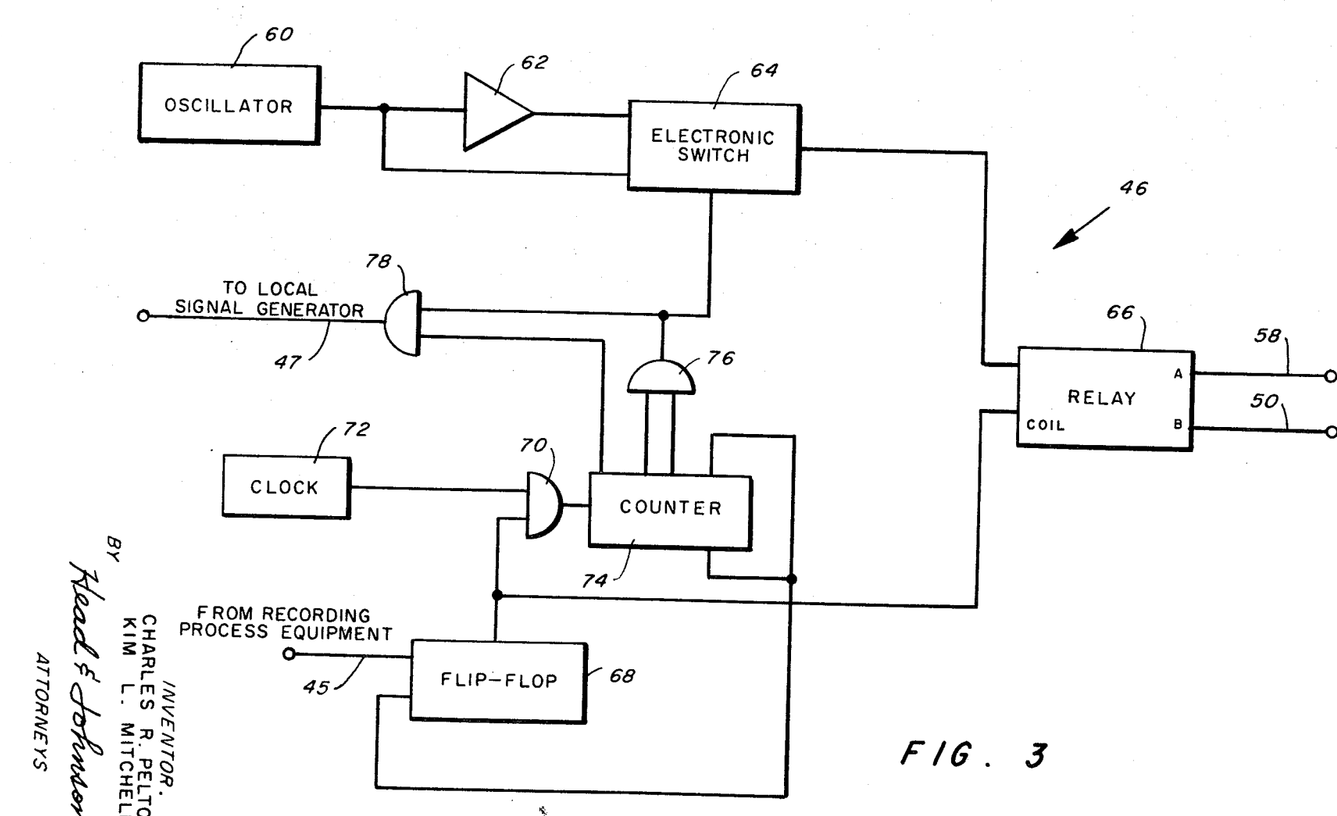
FIG. 3 is a schematic diagram of an encoding circuitry for use with the invention.
Figure 4:
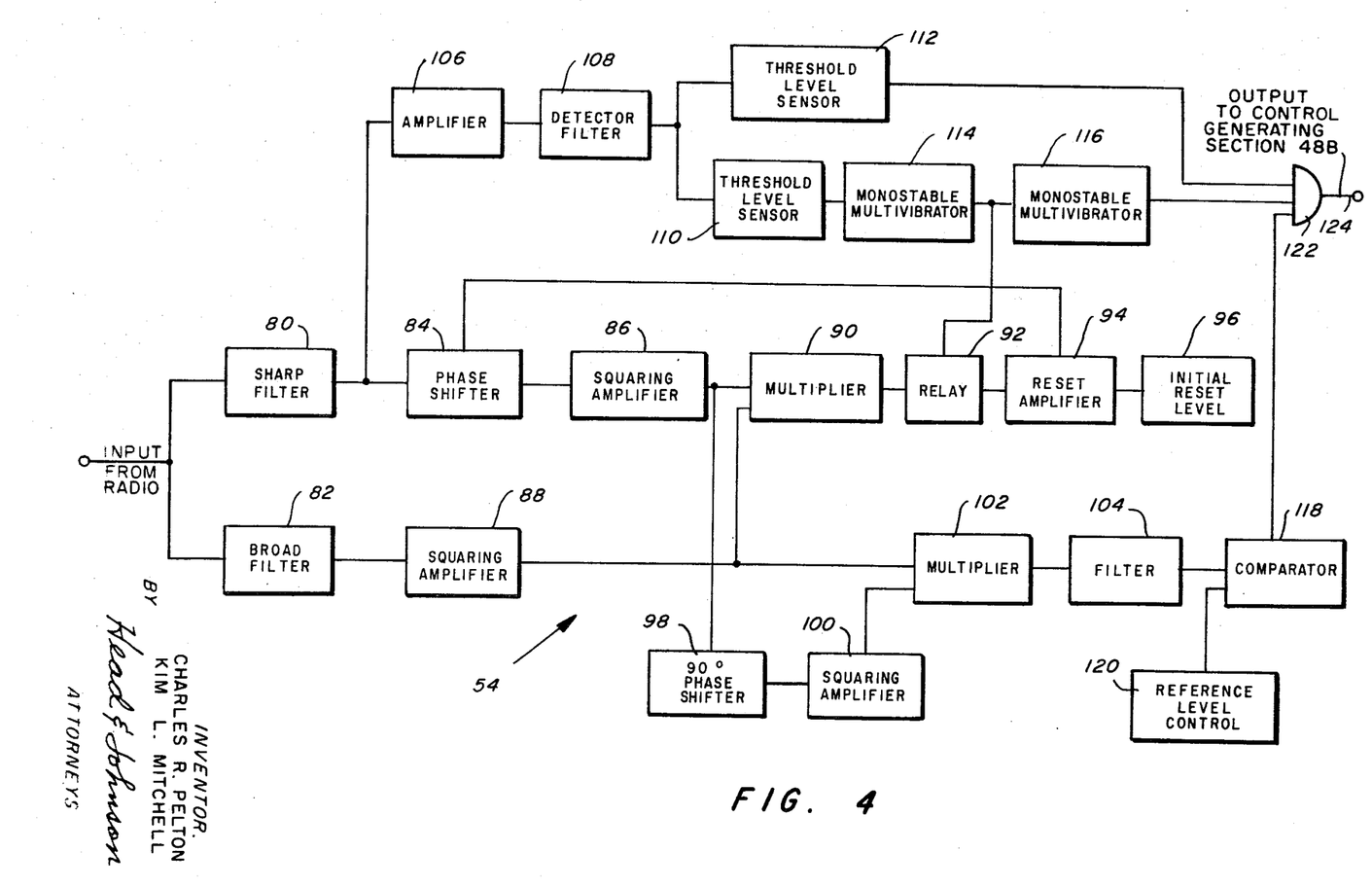
FIG. 4 is a schematic diagram of the decoding circuitry section for use with invention.
Figure 5:
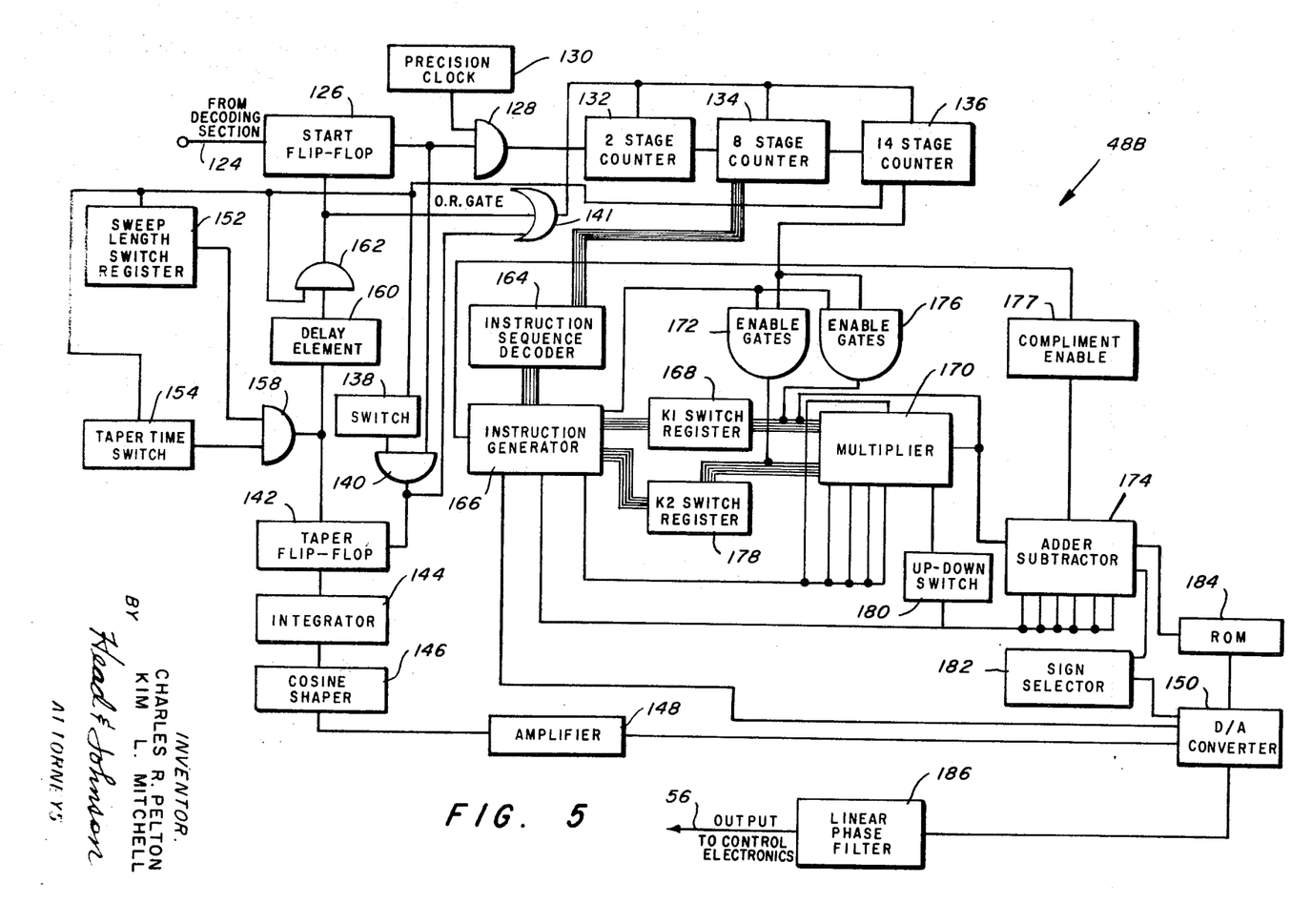
FIG. 5 is a schematic diagram of a control signal generating circuit for use with this invention.

To better understand the operations of the encoding analog-digital control signal generator 42 and the decoding analog-digital control signal generator 44, attention will now be turned to FIGS. 3, 4 and 5 where an amplification and analysis of the circuitry therein will facilitate the understanding of this method of remotely controlling and activating a seismic vibrator.

ENCODER

Looking now at the encoding section, as shown in FIG. 3, the function of the encoder is to generate a coded tone to start at precisely the same time the remote generators or computers at the vibrators and at the recording-processing equipment. It is to be understood that while only one remote vibratory system is depicted in the drawings, a multiplicity of such stations may be used and excited by encoder analog-digital control signal generator 42. The explanation of only one system is for the sake of clarity and simplicity and the remaining remote stations are identical in both makeup and operation.

Referring to FIG. 3, a stable oscillator 60 generates a tone, the frequency of which is approximately equal to the center frequency of the band pass filters in the decoder section which will be subsequently discussed.

The polarity of the tone is reversed by a unity gain inverting amplifier 62, so that both polarities of the tone are presented to an electronic switch 64. In the absence of a commence signal, electronic switch 64 connects the non-inverted tone to the A contact of a relay 66. When a commence signal is present, the inverted tone is connected to the A contact of relay 66.

The timing sequence starts when a commence pulse from recording-processing equipment 14 is presented to a flip-flop 68 through lead 45. The output of flip-flop 68 energizes relay 66 connecting the tone to transmission line or wire 58. Contacts B of relay 66 may be used to key a transmitter over line 50. Flip-flop 68 also enables an "AND" gate 70, allowing pulses from a precision clock 72 to increment counter 74.

Substantially 750 milliseconds (ms) after the commence pulse, signals from counter 74 enables a second "AND" gate 76, causing electronic switch 64 to reverse the polarity of the tone. At 8 ms later, a third "AND" gate 78 is enabled, generating a pulse on lead 47 to a local control signal generating section, which starts to generate a unique signal.

One second after the commence pulse, a signal from counter 74 resets both counter 74 and flip-flop 68. This returns the encoder to its original state, preparing it for the next commence pulse.

DECODER

Turning now to FIG. 4, there is shown the circuitry of a typical decoding section 54. The decoding section receives at the input thereof the coded tone picked up by antenna 35, decodes such tone, and presents a start pulse to the control signal generating section 48B.

The input signal, consisting of the tone code from encoding section 46 and possibly unwanted noise and interference pickup during transmission, is applied to a sharp filter 80 and to a broad filter 82. Virtually all of the unwanted noise and interference is removed by sharp filter 80, so that its output contains only the transmitted tone, shifted in phase by a constant but uncertain amount. This filtered tone is applied to the input of phase shifter 84, a device which shifts the phase of the tone by any amount from 0° to 360° depending on the level of the control voltage. The output of phase shifter 84 is connected to squaring amplifier 86, a high gain amplifier which converts the sinusoidal tone to a fixed amplitude square wave having the same crossover times.

The broad filter 82 rejects much of the unwanted noise and interference from the input signal and has a sinusoidal output which is converted by a second squaring amplifier 88 to a fixed amplitude square wave having the same crossover time.

The fixed amplitude square waves from squaring amplifiers 86 and 88 are multiplied together by multiplier 90. If relay 92 is closed the output of multiplier 90 is filtered by a long time constant integrator in a reset amplifier 94. The resulting DC voltage is dependent on the phase relationship between the inputs to multiplier 90. If this phase relationship is 0° the voltage is maximum positive, decreasing through 0 volts at 90° to maximum negative at 180°. The sum of this DC voltage and the voltage from an initial reset level control 96 is connected to the control voltage input of phase shifter 84. If the phase relationship between the inputs to multiplier 90 is other than 90°, the DC voltage from reset amplifier 94 will cause the phase introduced by phase shifter 84 to change until the phase relationship is 90°. At this time the DC output of multiplier 90 is zero, so the control voltage from reset amplifier 94 no longer changes and the phase between the outputs of squaring amplifiers 86 and 88 is "locked in" at 90°. Relay 92 may now be opened and the phase will remain 90° for a short period of time because the output of the long time constant integrator in reset amplifier 94 cannot change rapidly.

The output of squaring amplifier 86 is integrated in 90° phase shifter 98 to produce a triangular wave with crossovers delayed 90° from the crossovers of the square wave input. This triangular wave is converted to a fixed amplitude square wave by a third squaring amplifier 100, the crossovers of which occur in phase with the crossovers of the triangle wave; therefore the output of squaring amplifier 100 is a square wave 90° out of phase with the output of squaring amplifier 86.

Since the phase relationship between the outputs of squaring amplifiers 86 and 88 has been corrected to 90°, the phase relationship between the outputs of squaring amplifiers 88 and 100 is 180°. These two outputs are multiplied together in a multiplier 102. A filter 104 eliminates all but the DC component of this output. Since the inputs to multiplier 102 are 180° out of phase, the DC component of the output is most negative. With the frequencies, bandwidths, and time constants used, about 200 ms from the start of the tone is required for the phase between the inputs to multiplier 102 to lock in at 180°.

An amplifier 106 increases the level of the sinusoidal tone from the output of sharp filter 80. A detector-filter 108 produces a DC voltage proportional to the magnitude of the tone and indicates the presence of a tone. Since sharp filter 80 removes almost all noise and interference from the input, only the desired tone can cause an output from detector-filter 108 of sufficient magnitude to be sensed by threshold level sensors 110 and 112.

When the tone is first applied to the input the change in state of threshold level sensor 110 provides a pulse to trigger a monostable multivibrator 114, which remains set for about 400 ms. During this 400 ms relay 92 is closed, and the previously described phase lock loop has adequate time to set the phase relationship between the inputs to multiplier 102 to 180°. When monostable multivibrator 114 times out after 400 ms relay 92 opens and a second monostable multivibrator 116 is triggered. It remains set about 400 ms.

Exactly 750 ms after the tone starts, the phase thereof is instantaneously changed 180°. The input to multiplier 102 derived from sharp filter 80 cannot change phase rapidly due to the extremely narrow bandwidth of this filter. The input to multiplier 102 derived from broad filter 82 can change phase much more rapidly because of the wider bandwidth. As a result the phase relationship between the inputs to multiplier 102 moves rapidly from 180° to almost 0° after the input phase reversal, and then slowly moves back to 180°. This causes the voltage from filter 104, which is most negative before the input phase reversal, to rapidly ramp to its most positive excursion and then slowly ramp back down to its most negative value.

A comparator 118 senses the time at which this voltage crosses zero and provides an output pulse at this time.

A reference level control 120 may be used to adjust the threshold level of comparator 118 slightly about 0 volts, thus providing a slight amount of control over the time at which a pulse occurs on the output of the comparator. With the frequencies, bandwidths, and time constants used, level control may be adjusted so that the pulse from comparator 118 occurs 8 ms after the input time phase reversal, or 758 ms after the start of the tone. At this time monostable multivibrator 116 is still set so it is supplying an output.

The tone is still present at this time so threshold level sensor 112 is supplying an output. Thus 758 ms after the start of the tone from encoding section 46, all of the inputs to an "AND" gate 122 are qualified to generate a start pulse at the output thereof which is directly coupled to the input of control signal generating section 48B by wire 124.

CONTROL SIGNAL GENERATING SECTION CIRCUITRY

Turning now to FIG. 5, there is schematically shown the circuitry of a typical control signal generating section 48B. The circuitry of generating section 48A is identical except the input thereof is coupled to encoding section 46 rather than decoding section 54. The purpose of control signal generating section is to locally compute the unique signal to be sent into the earth by vibrator 30. Mathematically this unique signal is represented by the sweep equation sine $(K_1 t \pm K_2 t^2)$.

The start pulse received over wire 124 from decoder section 54 sets a flip-flop 126. The output of flip-flop 126 enables an "AND" gate 128, allowing pulses from a precision clock 130 to increment two-stage counter 132, there beginning the timing sequence. Two-stage counter 132 provides pulses to an eight-stage counter 134 at a rate of 256,000 pulses per second. Eight-stage counter 134 provides the timing information required to initiate the commands which must be executed every 1/1024 seconds. Eight-stage counter 134 increments a 14-stage counter 136 at a rate of 1,024 pulses per second. 14-stage counter 136 provides the 14 bit time word used to compute the value of the sweep equation and also provides timing information required to control the operation of the sweep generator.

Fourteen-stage counter 136 provides signals to a delay switch 138 indicating 0 second, 0.5 second, and 1 second after the start pulse. The signal from AND gate 140 through OR gate 141 resets all of the counters to zero and sets a taper flip-flop 142; fourteen stage counter 136 now starts generating digital time words to be used in computation of the unique signal starting with zero.

Taper flip-flop 142 has a step function output which is integrated by an integrator 144 to produce a linear ramp function. The time constant of integrator 144 is adjusted so that the desired taper time is required for the ramp to reach full voltage.

The linear ramp function is converted to a cosinusoidal function by cosine shaper 146. This rounding of the corners of the linear ramp function by cosine shaper 146 has been found desirable as such eliminates spurious frequencies. An amplified low source impedance version of the cosine ramp is obtained from an amplifier 148, and this voltage is used as the reference voltage to a D/A converter 150. The D/A converter 150 is of the multiplying type and the output thereof is proportional to the value of this voltage. As a result, the envelope of the sweep from the D/A converter increases cosinusoidally from 0 at the beginning of the sweep to full value at the end of the taper time and remains at full value until taper flip-flop 142 resets.

A sweep length switch register 152 receives digital time information from fourteen stage counter 136 and produces an output when an integer number of seconds have elapsed. The number of seconds, from 1 to 15, is selected by the setting of the switches in the register thereof. A taper time switch 154 receives signals from fourteen-stage counter 136 indicating when 500 ms and 750 ms have elapsed since an integer number of seconds have passed. An "AND" gate 158 requires inputs from both taper time switch 154 and sweep length switch register 152. Thus "AND" gate 158 produces an output either 500 or 750 ms after the integral number of seconds set in the switch register.

The output from "AND" gate 158 resets taper flip-flop 142 which causes the output of integrator 144 to ramp down linearly. The output of cosine shaper 146 and amplifier 148 follows by also ramping down cosinusoidally. The envelope of the output of the D/A converter 150 then decreases cosinusoidally to zero during the taper down time, which is the time required for the output of integrator 144 to ramp to zero; the taper down time therefore being equal to the taper up time. The output of "AND" gate 158 is delayed by a delay element 160, so that the output of the delay element is valid for about 1 ms after the next integral second has elapsed. This output is applied to an "AND" gate 162. A signal from 14-stage counter 136 indicating when the next integral second has elapsed is also applied to "AND" gate 162, to produce therefrom an output one second after the integral second indicated by sweep length switch register 152.

The output of "AND" gate 162, which occurs at the same time that the output of amplifier 148 has tapered the output of D/A converter 150 to zero, resets the start flip-flop 126 and sets all counters to zero through OR gate 141, thus preparing the device for another initializing start pulse.

The previously described cycle occurs once every sweep. The cycle to be described next occurs once every 1/1024 seconds, or once every sample interval, and is the sequence of operations required to compute the value of the sweep equation for each sample interval.

Eight-stage counter 134 provides an 8 bit digital time word which indicates the progression of time within the 1/1024 second sample interval to a resolution of 256 parts.

An instruction sequence decoder 164 uses this time word to generate several outputs, each providing a pulse at a sequential point in time. These outputs are combined in an instruction generator 166 to supply control signals to operate certain arithmetical units. Pulses from instruction sequence decoder 164 will be numbered in chronological order. For example, the first pulse will be called time 1.

Time 1 generates a KI enable pulse. Depending on which switches of a KI switch register 168 are on, data will be presented to certain bits of the ACC input of a multiplier 170. Time 1 also generates an ACC load pulse, which enters the data into the ACC input of multiplier 170 and stores it there. Time 1 also generates a pulse to clear the output register of the multiplier.

Time 2 generates a T-enable pulse which enables a gate 172 which in turn allows the 14 bit time word from 14-stage counter 136 to be presented to the MQ inputs of multiplier 170. Time 2 also generates an MQ load pulse which enters the time word into the MQ input of the multiplier 170 and stores it there.

Time 3 – 18 generate 16 pulses which cause multiplier 170 to sample each successively more significant bit of the data in the MQ input and, if it is a one, to add the data in the ACC input to the contents of the multipliers output register before shifting the data in the output register 1 bit to the right. This causes multiplier 170 to multiply the contents of the MQ input by the contents of the ACC input and leaves the product in the multiplier output register.

Time 19 generates a pulse which makes the output of multiplier 170 available to the input of an adder/subtractor 174 and another pulse which enters this data into the input of the adder/subtractor.

Time 20 generates a pulse which clears the multiplier's output.

Time 21 generates a T-enable pulse, enabling gate 172 and a gate 176 to allow all the 14 bit time word from 14-stage counter 136 to be presented to the MQ and ACC inputs of multiplier 170. Time 21 also generates MQ load and ACC load pulses which enter the time word into the MQ and ACC inputs of multiplier 170 and stores it there.

Time 22–37 cause multiplication to occur as before. The product $t^2$ is left in output of multiplier 170.

Time 38 generates a pulse which makes the output of multiplier 170 available to the ACC input thereof. Time 38 also generates a pulse which enters this data into the ACC input of multiplier 170 and stores it there. Time 39 clears the output of the multiplier.

Time 40 generates a K2 enable pulse. Depending on which switches in a K2 switch register 178 are on, voltage will be presented to certain bits of the MQ input of multiplier 170. Time 40 also generates an MQ load pulse, which enters this data into the MQ input. Time 40 also generates a pulse which clears the output of adder/subtractor 174.

Times 41–56 cause multiplication to occur as before. The product $K2t^2$ is left in the output of multiplier 170.

Time 57 generates an OUT-AC pulse, which causes the contents of the input of adder/subtractor 174 to be transferred to the output thereof.

Time 58 generates a MUL STR pulse, which makes the output of multiplier 170 available to the input of adder/subtractor 174. Time 58 also generates an OUT-load pulse which enters this data into the input of adder/subtractor 174. Time 58 also generates an OUT-AC pulse, which causes the input of an adder/subtractor 174 ($K2t^2$) to be added to the output thereof ($K1t$), with the result left in the output. However, if UP-DOWN switch 180 is on, time 58 also generates an OUT-AS pulse, which causes $K2t^2$ to be subtracted from $K1t$. So depending on the position of up-down switch 170, the output of now adder/subtractor 174 contains a 9 bit word representing the angle ($K1t \pm K2t^2$).

The MSB of this 9 bit word represents the sign of the trigonometric sine of this angle. At time 59 the MSB is stored in sign selector 182, a one bit storage register. The second MSB indicates whether the angle is 0, $-\pi/2$ or $\pi - 3\pi/2$, or $\pi/2 - \pi$ or $3\pi/2 - 2\pi$. If the second MSB is 0, the 7 LSB's represent an angle between 0 – $\pi/2$ of which the trigonometric sine may be taken directly. If the second MSB is 1, the 7 LSB's must be complimented by compliment enable 177 before the trigonometric sine may be taken. So at time 59 the second MSB of the output of adder/subtractor 20 is sampled. If it is 1, three additional instruction times, 60–62, are generated.

Time 60 generates an OUT-STR pulse which presents the 7 LSB's of the output of adder/subtractor 174 (containing $K1t \pm K2t^2$) to the input of adder/subtractor 174. Time 60 also generates an OUT load pulse which enters this data into the input of adder/subtractor 174.

Time 61 generates an OUT-RA pulse which clears the output of adder/subtractor 174.

Time 62 generates a pulse which borrows 1 from the LSB of the data in adder/subtractor 174.

Time 62 also generates a pulse which causes the input adder/subtractor 174 to be subtracted from zero. These operations change all zeros to ones, and vice versa, which in effect, compliments the 7 bit number in adder subtractor 20's output register.

The seven least significant bits of this 8 bit number represent an angle between 0° and 90° whose trigonometric sine is equal to the absolute value of the desired trigonometric sine, that is, of the angle $K1t \pm K2t^2$.

Time 63 makes the output of adder/subtractor 174 available to the input of read-only-memory 184. Read-only-memory 184 is a 1,024 bit memory preprogrammed as a sine look-up table. That is, when addressed by a digital word representing an angle, its output supplies a digital word representing the trigonometric sine of that angle. So the output of read-only-memory 184 is now a digital word representing the absolute value of $\sin[K1t - K2t^2]$.

Time 63 also generates a pulse which enters data from read-only-memory 184 and sign selector 182 into the input of D/A converter 150 and stores it there. D/A converter 150 generates an analog voltage proportional to the product of this digital information and the reference voltage from amplifier 148. This analog voltage remains constant for 1/1024 seconds, until time 63 of the next sample interval. So that output of D/A converter 150 is a stepwise approximation of the swept frequency sinusoidal wave, $\sin[K1t \pm K2t^2]$. Linear phase filter 186 removes the steps from this wave by filtering out high frequencies. The output of linear phase filter 186, though slightly delayed in time, is an accurate representation of $\sin[K_1t \pm K_2t^2]$. $\sin[K_1t \pm K_2t^2]$ as before mentioned is the desired sweep equation for the unique signal. The output of linear phase filter 186 is coupled to control electronics via lead 56, which in turn passes the signal to vibrator 30 for introduction into the earth.

Further understanding of the terminology and circuitry of this invention is facilitated by reference to the diagrams and internal couplings of the numerous electronic components as set forth in the literature distributed by the manufacturers thereof. The following is a list of typical manufacturers as well as the respective catalog number of each component.

LEGEND

| Reference Number | Manufacturer's Catalog Number |
|---|---|
| | ENCODER SECTION |
| 60 | Precision oscillator, frequency in 2 to 3 KHZ range, matched to center frequency of filters 1 and 2 in Decoder, composed of Motorola No. K1000A Electro-magnetic resonator in standard Motorola encoder circuit. |
| 62 | National Semi No. LM307 with feedback resistors to form inverting, gain of one amplifier. |
| 64 | SPDT electronic switch, composed of Siliconix No. VCR3P FET's and associated driving circuits. |
| 66 | Hart Advance DPDT relay. |
| 68 | Flip-flop Texas Instrument No. 7474. |
| 70 | "AND" gate—¼ of Texas Instrument No. 7400. |
| 72 | 1.048576 MHZ crystal oscillator—International Crystal Corp. |
| 74 | 22 stage counter consisting of 5 ½ of Texas Instrument No. 7493 in series. |
| 76 | "AND" gate—¼ of Texas Instrument No. 7400. |
| 78 | "AND" gate—¼ of Texas Instrument No. 7400. |
| | DECODING CIRCUIT |
| 80 | Electro-magnetic resonator—Motorola No. K1000A. |
| 82 | Parallel inductor-capacitor tuned circuit, Q Figure of merit of approximately 70. |
| 84 | 2 stages of variable phase shift, each composed of transistor (2N3900A) 4-phase splitter driving fixed capacitor and voltage variable resistor (Siliconix No. VCR3P FET). |
| 86 | National Semiconductor LM311 comparator. |
| 88 | National Semiconductor LM311 comparator. |
| 90 | Exclusive OR gate—¼ of Texas Instrument No. 7486. |
| 92 | SPDT relay—Magnecraft. |
| 94 | Integrating amplifier National Semi No. LM307 with resistance-capacitance feedback network. |
| 96 | Potentiometer-Clarostat No. 63M5. |
| 98 | Resistance-capacitance integrator. |
| 100 | National Semi No. LM311 comparator. |
| 102 | Exclusive "OR" gate—¼ of Texas Instrument No. 7486. |
| 104 | Resistance capacitance low pass filter. |
| 106 | GE 2N3900A transistor in conventional class A amplifier circuit. |
| 108 | Texas Instrument No. IN270 diode rectifier and resistance capacitance low pass filter. |
| 110 | Conventional Schmitt trigger circuit, using Motorola MPS 6518 and MPS3704 transistors. |
| 112 | Conventional Schmitt trigger circuit, using Motorola MPS 6518 and MPS3704 transistors. |
| 114 | Fairchild No. 9601. |
| 116 | Fairchild No. 9601. |
| 118 | National Semi No. LM311 comparator. |
| 120 | Potentiometer-Clarostat No. 63M5. |
| 122 | 3 input "AND" gate—⅓ of Texas Instrument No. 7410. |
| | CONTROL SIGNAL GENERATING SECTION |
| 126 | Flip-flop—½ of Texas Instrument No. 7474. |
| 128 | AND gate—¼ of Texas Instrument No. 7400. |
| 130 | 1.048576 MHZ Crystal oscillator—International Crystal Corp. |
| 132 | 2 stage binary counter—½ of Texas Instrument 7493. |
| 134 | 8 stage binary counter—2 Texas Instrument No. 7493. |
| 136 | 14 stage binary counter—2 ½ Texas Instrument No. 7493 in series. |
| 138 | Switch SPTT-ALCO. |
| 140 | AND Gate—¼ of Texas Instrument No. 7400. |
| 142 | Flip-flop—½ of Texas Instrument No. 7474. |
| 144 | Active integrator, composed of National semi-conductor LM307 adjustable input resistor, and feedback capacitor. |
| 146 | Cosine shaper network composed of diodes, such as Texas Instrument No. IN457A and selected resistors. |
| 148 | Amplifier - National Semiconductor No. LM307. |
| 150 | D/A converter composed of Fairchild 3750, Beckman 812 ladder network, Nat semi-conductor LM307 offset correction stage, LM307 sign |

| | |
|---|---|
| | selection inverter stage, drive by VCR3P (Siliconix) FCT switch. |
| 152 | Group of 4 SPDT switches ALCO. |
| 154 | Switch SPDT-ALCO |
| 156 | AND Gate—¼ of Texas Instrument No. 7400. |
| 160 | Delay element (resistance-capacitance network), |
| 162 | "AND" Gate—¼ of Texas Instrument No. 7400. |
| 164 | 1 of 24 decoder—Motorola 3 MC4038's. |
| 166 | 1 multiple input "OR" gate for each command Texas Instrument 7410. |
| 168 | Group of 7 SPST switches ALCO. |
| 170 | Composed of 4 – 8 bit parallel accumulators—Fairchild No. 3800. |
| 172 | "AND" Gate—¼ of Texas Instrument No. 7474. |
| 174 | 8 bit parallel accumulator—Fairchild 3800. |
| 176 | AND Gate TI, ¼ of Texas Instrument No. 7474. |
| 177 | One bit storage element—½ of Motorola No. 7479 and, "AND" Gate—Texas Instrument No. 7400. |
| 178 | Group of 7 SPST switches ALCO. |
| 180 | Switch SPST-ALCO. |
| 182 | One bit full adder—Texas Instrument No. 7480 and one bit storage element—½ of Motorola No. 7479. |
| 184 | 1024 bit read only memory programmed as sine look-up table—PHILCO No. PMS1024C. |
| 186 | Active 3 pole Paynter linear phase filter composed of Nat. semi LM307 and resistance-capacitance network. |

During the detailed description of the preferred embodiments specific language has been used for the sake of clarity, however, it is to be understood that the words used are not words of limitation and include all equivalents which operate in a similar manner to accomplish a similar purpose.

It will be clear that the control signal generating sections 48A and 48B are identical. Generating section 48B gets its input from decoding section 54 since it is at a remote point and must receive its starting signal via radio in the form of a coded signal. On the other hand the generating section 48A is adjacent to both the recording-processing equipment 14 and the encoding section, and can receive its starting signal as a facsimile pulse via line 47 directly from gate 78, which is timed to occur at the same time as the pulse generated in the decoding section. This facsimile pulse is timed to be simultaneous with the pulse generated in the decoding section, and may be called a facsimile of the decoded, coded signal. More generally, the equipment at the encoding analog-digital control signal generator can comprise an encoding section 46, and a decoding section 54 and a control signal generating section 48A.

Also, while we have shown a purely digital means for directly generating the sweep signal to be supplied to the vibrator, it will be clear that, as shown in FIG. 1 of U.S. Pat. No. 3,460,648, the sweep signal can be locally generated digitally, or locally stored as a digital or analog record, as is well known in the art.

Also, while we speak of phonographically recording the received unique signals, we include any means of recording such signals in such form that the recorded signals can be played back to regenerate the received unique signals. The preferred method of phonographically recording is by means of a magnetic recorder.

What is claimed:

1. In a seismic system having at a first location at least one vibrator capable of imparting a unique signal into the earth, having at a second location a recording means and a detector array electrically coupled to said recording means, said detector array adapted to receive said unique signal after transmission through the earth from said first location, a method of providing a selected unique signal to each of said first and second locations, comprising the steps of:
   a. generating a selected short-duration coded signal,
   b. simultaneously transmitting said coded signal to said first and second locations,
   c. generating a selected unique signal responsive to the arrival at said first location of said coded signal, and
   d. generating an identical selected unique signal responsive to the arrival at said second location of said coded signal.

2. A method as in claim 1 in which said step of generating said selected unique signal includes the step of decoding said coded signal.

3. A method as in claim 1 in which said coded signal transmitted to said second location comprises a facsimile of the decoded, coded signal.

4. A method as in claim 1 in which the step of generating a selected short-duration coded signal is responsive to the step of transmitting a commence pulse from said recording means.

5. A method as in claim 1 including the additional steps at said first location of transmitting said unique signal to said vibrator and imparting said unique signal into the earth.

6. A method as in claim 1 including the additional step at said second location of phonographically recording said unique signal.

7. A method as in claim 6 in which said step of phonographically recording said unique signal comprises magnetically recording said signal.

8. In a seismic system having at a first location at least one vibrator capable of imparting a unique signal into the earth, having at a second location a recording means, and a detector array electrically coupled to said recording means, said detector array adapted to receive said unique signal after transmission through the earth from said first location, the improvement comprising:
   a. means for generating a selected short-duration coded signal, and a facsimile signal,
   b. means for simultaneously transmitting said coded signal to said first location, and said facsimile signal to said second location,
   c. means at said first location for receiving and decoding said selected coded signal,
   d. means at said first location responsive to said decoded, selected coded signal for generating a selected unique signal, and
   e. means at said second location responsive to said facsimile signal for generating an identical unique signal, said facsimile signal occurring simultaneously in time with said decoded, selected coded signal.

9. A seismic system as in claim 8 including means at said first location for transmitting said selected unique signal to said at least one vibrator, whereby said unique signal is imparted into the earth.

10. A seismic system as in claim 8 including means at said second location to phonographically record said unique signal.

11. A seismic system as in claim 8 including means at said second location for generating a commence pulse and means for transmitting said commence pulse to said coded signal generating means.

12. A seismic system as in claim 8 in which said means for generating said unique signal comprises:
- a start flip-flop having a set input, a reset input and an output; said set input receiving said signal from an encoder;
- a two-input "AND" gate, one of said inputs being electrically coupled to said output of said start flip-flop;
- a precision clock electrically coupled to the second input of said "AND" gate;
- a two-stage counter having an enable input; reset input; and output; said set input being electrically coupled to said output of said "AND" gate;
- an eight-stage counter having an enable input, reset input and output, said enable input being electrically coupled to the output of said second stage counter;
- a 14-stage counter having an enable input, reset input and output; said enable input being electrically coupled to the output of said eight-stage counter;
- a sweep length switch register having an output;
- a manual switch having an output;
- a second two-input "AND" gate; one of said inputs being electrically coupled to said sweep length switch register and the other of said input signals being connected to said manual switch;
- a first relay having an input connected to the output of said second "AND" gate, said relay having an output;
- a third two-input "AND" gate having one input thereof electrically coupled to the output of said relay and a second input being electrically coupled to the output signal of said 14-stage counter, the output of said third "AND" gate being electrically coupled to the reset input of said start flip-flop;
- a taper flip-flop having an input electrically coupled to said second two-input "AND" gate and further having dual outputs;
- an integrator having an input and output, said input being electrically coupled to the output of said taper flip-flop;
- a cosine shaper having an input electrically coupled to the output of said integrator and further having an output;
- a digital-to-analog converter having an input electrically coupled to the output of said cosine shaper;
- a manual switch;
- a fourth two-input "AND" gate, one of the inputs being electrically coupled to said manual switch, and the other being electrically coupled to the output of said start flip-flop, the output of said fourth "AND" gate being connected to said taper flip-flop;
- a fifth dual input "AND" gate, one input being electrically coupled to the output of said second "AND" gate and the other being electrically coupled to the output of said fourth "AND" gate; the output of said "AND" gate being connected in parallel to said second-stage, eight-stage, and 14-stage counters;
- an instruction sequence decoder having a plurality of inputs electrically coupled to the outputs of said eight-stage counter and having a plurality of outputs; an instruction-in generator having a plurality of inputs electrically coupled to said plurality outputs of said instruction sequence decoder.

* * * * *